(12) United States Patent
Kellum (10) Patent No.: US 6,487,664 B1
(45) Date of Patent: Nov. 26, 2002

(54) PROCESSES AND SYSTEMS FOR SECURED INFORMATION EXCHANGE USING COMPUTER HARDWARE

(75) Inventor: Charles W. Kellum, Alexandria, VA (US)

(73) Assignee: E-Com Defense, Inc., Alexandria, VA (US)

( * ) Notice: Subject to any disclaimer, the term of this patent is extended or adjusted under 35 U.S.C. 154(b) by 0 days.

(21) Appl. No.: 09/198,411

(22) Filed: Nov. 24, 1998

(51) Int. Cl.$^7$ ................................................. H04L 9/00
(52) U.S. Cl. ....................................................... 713/200
(58) Field of Search ................................. 713/200, 201, 713/160, 156, 188, 176, 154, 165

(56) References Cited

U.S. PATENT DOCUMENTS

| | | | | |
|---|---|---|---|---|
| 5,623,600 A | * | 4/1997 | Ji et al. ................. | 395/187.01 |
| 5,701,342 A | * | 12/1997 | Anderson et al. .............. | 380/4 |
| 5,983,348 A | * | 11/1999 | Ji ............................... | 713/200 |
| 6,092,191 A | * | 7/2000 | Shimbo et al. ............. | 713/153 |
| 6,141,681 A | * | 10/2000 | Kyle .......................... | 709/206 |
| 6,367,012 B1 | * | 4/2002 | Atkinson et al. ........... | 713/176 |

OTHER PUBLICATIONS

Microsoft Press Computer Dictionary (Third Edition) Copyright 1997 by Microsoft Corporation pp. 440–441.*

Thurman, Mathias; On The Trail of an Elusive Trojan Horse, Computerworld, Inc., USA. May 2001, p. 58.*

* cited by examiner

Primary Examiner—Gail Hayes
Assistant Examiner—Leynna Ha
(74) Attorney, Agent, or Firm—Dowell & Dowell, P.C.

(57) ABSTRACT

A system and method for providing external data-signal isolation, and signal-level information-preserving-data-transformations, to enable safe, operationally efficient, information sharing between protected information systems and networks and external, potentially hostile, information systems and networks which neutralizes any imbedded hostile executable codes such as viruses that may be in data-signals incoming from the external systems and networks. The system and method prevent untransformed external data-signals from entering protected systems and/or networks using an intermediate screen which is a computer hardware device. The intermediate screen is deployed between the protected systems and external systems and is used to process all incoming signals from the external system to obtain transformed data sets from which information is extracted before it is passed to the protected system.

24 Claims, 9 Drawing Sheets

PROCESSES AND SYSTEMS FOR SECURED INFORMATION EXCHANGE USING COMPUTER HARDWARE

BACKGROUND OF THE INVENTION

1. Field of the Invention

This invention relates to methods and devices for the safe and secure operation of host information systems which must exchange information with other information systems and devices, such as in cyberspace and, where such external systems may be corrupted in some manner, utilizing system architecture and data signal transformations as opposed to conventional software based firewalls to receive and convert or reformat incoming information signals from the external systems and thereafter extracting and supplying only non corrupted information signals to the host systems. The invention also provides for screening of outgoing information signals from the host systems to prevent unauthorized information exchange and for permitting secure updating of host systems files with information before updated files are returned to the host systems.

2. Description of the Prior Art

The field of information-system security (InfoSec) technology and practice to date has focused on controlling human user access to computer system resources, and preventing hostile, clandestine computer programs, such as computer viruses, from corrupting a computer system. The advent of the Internet and personal computers brought new challenges to the InfoSec field, particularly because in networks, other machines, not human users, were the entities that primarily accessed a computer system. Old, pre-network, password usage and similar software authentication methods only offered a modicum of security control at "authorized user" entry points of a network. Intruders could bypass these methods as they do in today's Internet and tap or hack (i.e. the term hackers) into the communications segment of a computer network and launch any form of mischief or disruption that the target network would allow. This is the core of today's Internet security problem, wherein intruders can disrupt nearly all forms of Internet activity, from disabling web sites and compromising message traffic, to falsifying identity. The conventional InfoSec problems of unauthorized user access, incorrect operation, and system malfunction remain, in addition to today's network oriented security problems.

Various schemes of varying degrees of complexity and convolution have been devised to provide needed security. Examples of two of the latest of such schemes are U.S. Pat. Nos. 5,623,601 to Vu, and 5,632,011 to Landfield, et al. The methods taught are implemented as software computer programs, which operate with or as a standard operating system software package. Assumed in the methods are the correct implementation and operation of these software packages, and the operating system (i.e. control software) with which it must operate. Here, "correct operation" also includes InfoSec correctness which means no compromise to a hosting system is precipitated by the operation of such software. Proving or verifying such assertions as software correctness, or software operational integrity remains a major barrier in InfoSec technology, as well as in computer science and engineering in general. Software verification is a formidable undertaking. Finally, software (i.e. computer programs) is vulnerable to compromise by other computer programs, which may include viruses. Software attack and corruption, whether e-mail packages, protocol modules, operating systems, macro services such as OPEN commands, etc. is the realm of the system/network intruder (the Hacker). The ideal InfoSec tool should not be software dependant.

Today's InfoSec tools such as the above cited references implement, in software, a type of gateway function. The term firewall is often used. A gateway is a computer that connects two different networks together. A firewall is a gateway with the additional constraints and properties that all inter-network traffic must pass through it, whereby all unauthorized (according to some rule-set or security policy) traffic is prevented from passage. The firewall must operate correctly and be free from compromise. To further compound this difficulty, firewalls are filters. As such they must allow selected external traffic to pass through to the system or network being protected, especially if useful information exchange between the systems and networks separated by the firewall, is to take place. Firewalls have no way to filter out hostile traffic, without prior knowledge of such traffic. Also, service packages, such as e-mail, containing corrupted command macro programs (e.g. macro viruses) are impervious to firewalls. Possible legitimate bit configurations in command fields of standard message traffic passing through a firewall could trigger disruptive events, when entering a protected system or network. Firewalls, acting as an address translation proxy for an inside/protected system or network, can protect that system or network from exposure, to an external system or network, of its internal and critical address information. Again, one assumes (usually, without rigorous basis) correctness of the proxy software function.

Although firewalls and anti-virus software are steps in the right direction, more universal protection of information systems or networks is needed, whereby such protection is easily verifiable, cost-effective, and does not require "apriori knowledge" to successfully execute a detection and/or filtering function, and is software independent.

SUMMARY OF THE INVENTION

The present invention is directed to the use of a computer hardware device which functions as an inter domain screen or signal processor hereafter referred to as the IDS. The IDS is a unique data flow control architecture and device family, within which two unique processes are executed. The IDS protects its host system from compromise from any external connections. The IDS contains an intermediate-domain-device (IDD), sockets which connect the IDD to the host system, and sockets which connect the IDD to external domains. External domains, which are to exchange information with the host, are prevented, by the IDS from compromising the host. The intermediate domain (embodied by the IDD) is a special purpose domain for information exchange. The purpose of the IDS is to permit maximum information interchange, while preventing external signals from directly entering a protected domain or host. The term "host system" is used synonymously with "protected domain". The external signals may be the carrier of hostile executable code. Viruses, worms, triggers for trap-door and Trojan horse type software, and other forms of hostile signals use incoming data signals to enter a protected (target) information system environment. That is, the information being exchanged, including any hostile data, is contained in data sets carried by signals. The hostile data sets depend on the structural integrity of the incoming data stream or signal(s) for the necessary maintenance of its own structure. With the present invention, this structural integrity is disrupted, while the information carried by the data stream is preserved in the IDS. The InfoSec processes executed are isolation of external signals, and derivation of the information content of such signals and are referenced as a modified-read process. To achieve this, an "information-preserving" data transformation takes place in the IDS on these potentially corrupted incoming external data signals such as by processing an incoming signal containing an initial data set in such a manner as to extract the information in the initial data set, thus creating a signal having a different data set, and, thereafter, transmitting the different data sets to the host domain. Such processing includes converting the type and/or format of signals such as converting a telephone signal to a T.V. signal or converting an analog signal to a digital signal.

The intermediate domain and the modified-read function which takes place therein form a protective screen for the internal or host system or domain, to which they are attached. The modified-read process does not require prior knowledge of a particular virus/worm, etc and is a universal eliminator of hostile executable code.

The IDS therefore is not a proxy-server or firewall which are vulnerable to software errors and/or compromise, and to unknown hostile executable code (i.e. new virus) penetration. The IDS is an incoming signal buffer and transformer and an outgoing signal filter. It is a hardware device that is scalable, that provides the special purpose domain for information data flow control. This special purpose domain is intermediate between the IDS's host system, which it is protecting, and external systems.

It is important to note that generic IDS functions and architecture enforce the following for the systems/networks it is protecting:

a) immunity to penetration;

b) assurance that all traffic between the protected domain and the external domain enters the IDS;

c) no direct connections between the protected domain the external domain exist; and d) only authorized information, as defined by local InfoSec policy is allowed to exit the IDS.

The IDS is a multi-function device acting as a firewall, a guard/filter, a network front-end, and hostile code (e.g. virus) eliminator. The IDS may also act as a host system file screen which is adapted to receive file information from the host system, screen new file information and thereafter update existing files in the host system.

The present invention is directed to a method and apparatus for enabling information to be exchanged between a protected system and an external information source wherein the information is contained in data sets which are carried by signals in such a manner that undesired data is prevented from reaching the protected system. The invention uses an intermediate domain computer hardware device which is connected between the external data source and the protected system so as to receive an initial data set including the information which may contain undesirable data transmitted from the external source. In the intermediate domain hardware, the signals containing the initial data set are processed to create a second data set in such a manner that the information in the initial data set, is extracted to thereby screen out undesirable data. Thereafter, the extracted information is passed to the protected system.

In the elementary version of the invention, the intermediate domain computer hardware device (the IDD) may be a network computer, a webtv unit, a single board computer (SBC), a laptop/notebook computer, other personal computer (or the like), or a specially designed chip which receives signals in any manner such as broadcast signals or signals from a conventional telephone line from an external domain site such as the internet or world wide web. The incoming signals to the hardware device are routed (via the IDD) to what is tantamount to a tv card associated with a PCI bus of a computer system. The intermediate/domain device (IDD) in the form of the webtv system transforms the incoming signals. Any virus contained in the original signals can not survive the transformation of the signal format from the signals originally received, (such as by way of the telephone line), to the video signals at the tv-card and thus the card supplies extracted information to a connected computer which may be a personal computer.

As a reduced function (manual) embodiment of the elementary system, signals from the computer hardware device such as in a webtv system may be conveyed to a conventional printer wherein the signals are converted or transformed into a printed format which may be preserved. By taking the printed format and transforming the printed format into signals, such as by scanning, the information can be provided from the printer to the input of a PC such that only the extracted information without any viruses is passed to the personal computer or host system. In both the foregoing scenarios, the virus (or other forms of hostile code) can not survive the signal transformation within the intermediate domain system.

As mentioned, as opposed to using the webtv unit, a single board computer, laptop or notebook computer may be utilized to act as the intermediate domain device. The laptop or single board computer is connected to receive a signal such as through a telephone line from the internet. The invention, however, is not limited in its application to single point or individual host or host systems. the host may be substantially any single receiving information processor including main frame computers, information networks including local and wide are networks (LANs and WANs) and the like. Also, the computer hardware of the IDS is not limited to single or individual computer elements but may be computer networks and systems.

Any contamination of the IDS' intermediate domain from system error or hostile executable code from external domains, is easily corrected by a reset function, or a cold-boot from a clean boot-disk. For some applications, this could be a recommended periodic procedure. Thus, the initial data set including any hostile executable code data is deleted from the intermediate domain after the information has been extracted. The IDS architecture insures that only data that has gone through a modified-read process enters the host (protected) system.

In another embodiment of the invention, the IDS is used to safely update files stored in the host system. In this embodiment, a file from the host is loaded to the IDS. The IDS also receives information signals from the external domain and processes the signals in a modified-read to thereby convert the signal to change an initial data set to a second data set in such a manner as to extract the information from the second data set and updates the file loaded from the host and thereafter forwards the safely updated file to the host. In this manner all updating of files is done in a manner in which the host files can not be compromised.

In yet another embodiment, the invention provides a screening of all outgoing signals from the host or protected system to the IDS so as to ensure that only permitted information is transmitted.

It is the primary object of the present invention to provide a method and apparatus which protects a host system from contamination by preventing external signals from entering the protected host system permitting safe "information"

exchange between the host and possibly hostile external domains and, in some embodiments, also preventing inadvertent and/or unauthorized release of data from the host system.

These and additional capabilities, utility, and attainments of the present invention, should become apparent to those skilled in the art, upon reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DETAILED DESCRIPTION OF THE INVENTION

The invention has several fundamental embodiments which are described in the following sections. Other embodiments are derived from these fundamental embodiments. The term "domain" is used throughout this document. "Domain" is defined as a system or network or set of systems or networks. The term "router" refers to a computer that selects and implements, at the software level, data-paths from one location to another in a computer network. Also the term "signal" is used synonymously with data, data sets, files, messages, packets, protocol sequences, etc. throughout this document, to stress generality. Signals, as referenced herein, refer to any information carrying quanta, such as electromagnetic current, lightwaves, which are processable by information system technology. It is fundamental to realize that data, data sets, control commands, etc., are manifested as electronic signals and/or electro-optic signals and that information systems and networks transform and tranceive such signals, and that the invention as described more fully below, operates at this fundamental signal level.

Prior Art Attempts

Figure 1:
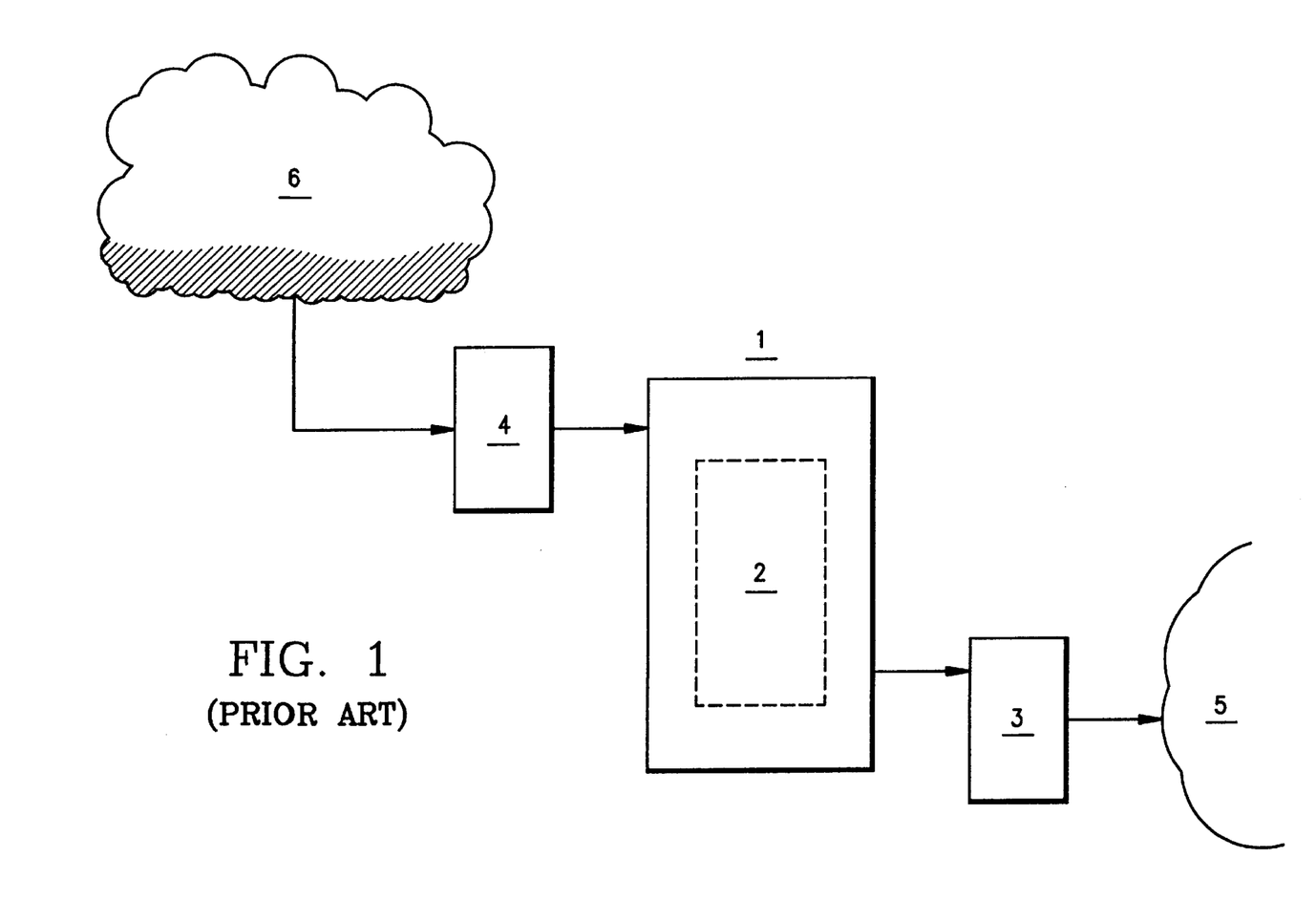
FIG. 1 is an illustration of a prior art firewall configuration wherein a protected system is connected to an external system via an intervening firewall arrangement consisting of a gateway function processor surrounded on either side by a router function.

Referring to FIG. 1, there is illustrated a prior art firewall arrangement. An ordinary gateway function module 1 sits between two filtering routers 3 and 4. One router 3 is connected to an internal network 5 and the gateway 1. The other router 4 is connected to an external network 6 and the gateway. These modules and especially their software must interact in an error-free and complex fashion to enforce a security policy for information transfer between the internal network and the external network. Since these modules primarily implement a filtering function 2, which implies that externally generated signal traffic will enter the internal network. Such traffic may be contaminated, and thus compromise the internal network. All methods in current practice are software based, and operate on a framework derivable from that depicted in FIG. 1. Generally, software cannot be "trusted" to function correctly, where "trusted" is defined to include provable correctness in structure, compilation, installation, operation. Also hacking and other types of intrusions attack the software of the networks that are targeted. A prime example is the Internet where intrusions, hacking, web-site compromise, and other forms of software misuse are rampant.

Hardware-Based InfoSec Provided by the Present Invention

Figure 2:
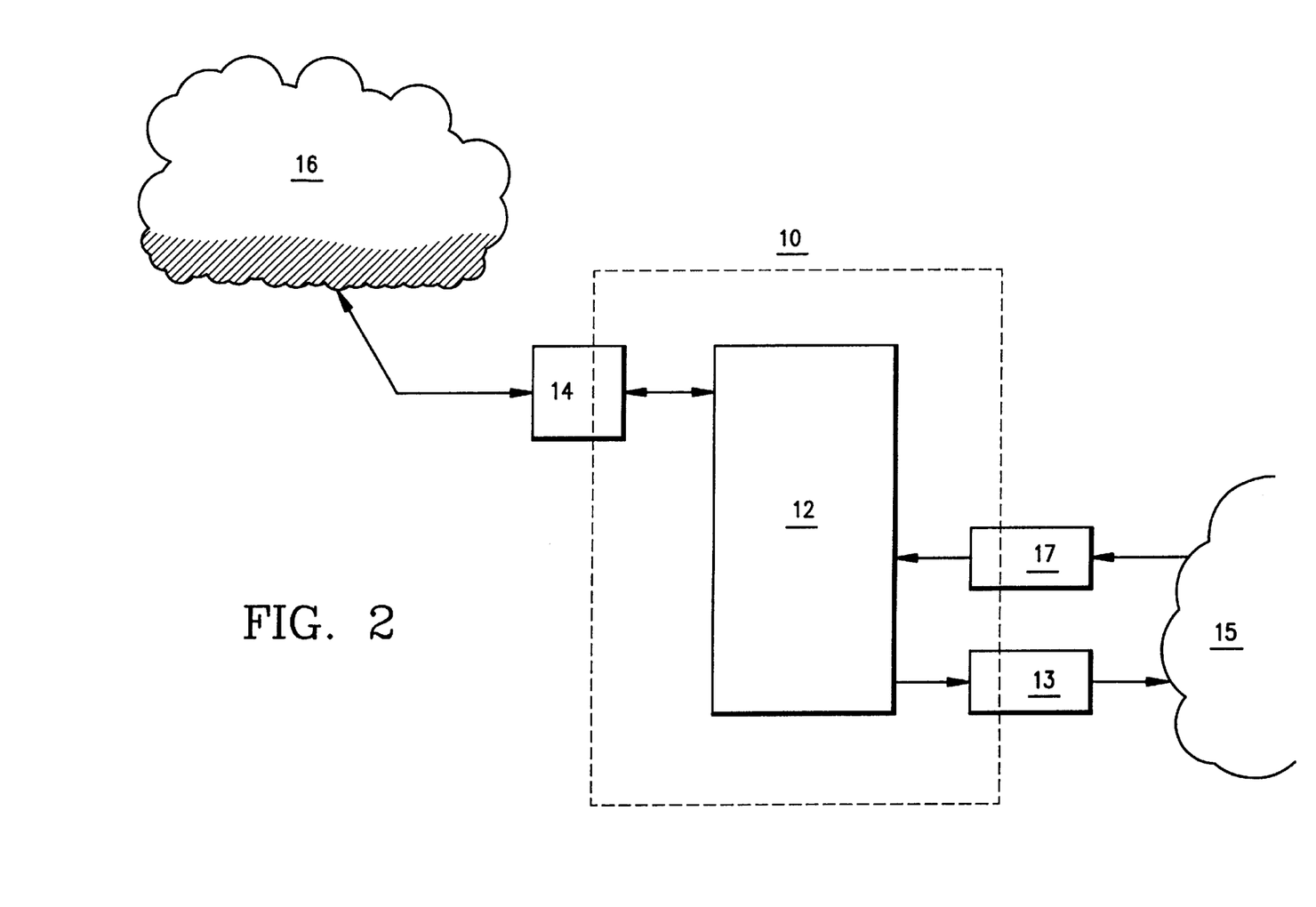
FIG. 2 illustrates an intermediate domain screen (IDS) device of the present invention separating an internal or host domain, that is protected by the invention, and an external domain that might be hostile and/or corrupted.

Referencing FIG. 2, the intermediate domain screen (IDS) 10 of the present invention is a hardware system composed at least three (3) and in some embodiments of four (4) generic hardware components. The basic components are an Intermediate-Domain-Device (IDD) 12, an external domain socket 14, and an IDS to internal domain socket 13. A fourth hardware component is an internal domain to IDS socket 17. The sockets can take the form of conventional modem type devices including special purpose signal processing and signal transfer components such as video, wireless communication, integrated telephony, and facsimile cards and the like, programmable systems or devices such as single board computers (SBC), smart digital signal processors, embedded systems and the like, large mainframes, local and/or wide area networks (LANs/WANs). The invention physically and logically separates an internal domain 15 from an external domain 16. The internal domain can range from a single system such as a personal computer or web site to a network, as can the external domain. The internal domain is the domain being protected by the invention, and is referred to as the host or protected domain. Each of the sockets 13, 14 and 17 can be implemented as a set of sockets. Socket 13 allows only specific types of signals or data sets to inter the host 15. Socket 17 performs a filter or guard function between the host 15 and the IDS, to restrict and control the release of signals from the host 15. The IDD 12, acts as a confinement domain for external signals or data sets carried by incoming signals, thus preventing viruses (and other forms of hostile code) contained in the external signals from entering the protected domain or host. The IDD provides an intermediate domain for safe information interchange between the internal-domain/host 15 and the external domain 16. This interchange includes execution of external programs, Internet access such as web browsing, updating internal-domain programs and software, which have been sent, via socket 17, to the IDD by a host filtering or selection process residing in the IDD for updating and/or other interaction with the external domain. The IDD executes an "information-preserving-data-transformation" process to extract necessary information from external signals and transmits such information, via socket 13, to the host 15. This process is called a modified-read (M-R), and in conjunction with socket 13 insures that only uncontaminated signals or data sets are transmitted to the host. Socket 13 transmits only signals that have undergone the (M-R) process.

The socket components 14, 13 and 17 must not communicate directly with each other in an IDS configuration. This could facilitate unauthorized data transfers. All data transfer must be monitored by the IDD 12. As an example; to insure this, a bus request pin of a network interface card, NIC, embodying socket 14 must be deactivated, i.e. grounded. This results in a "partially connected" hardware architecture. In many instances, InfoSec concerns must also include the possibility of compromise from within. Such compromise can be malicious, or inadvertent. The inadvertent compromise can result from system malfunction and/or user/operator error. In the data flow control framework, the unauthorized release of information as a result of such compromise is addressed by the invention, wherein the IDS can restrict host 15 users, i.e. insiders, to specific, controlled functions relative to the external domain 16. Socket 17 operation supplies a filter or guard function, the purpose of which is to prevent unauthorized release of data or information from a protected host. In this respect, the socket 17 may include a single board computer which is programmable to filter or screen signals passing from the host to the IDD so that only authorized or releasable data is allowed to enter the IDD from the host.

Large environments, such as networks are typical applications for versions of the IDS. Thus advanced, sophisticated filtering type functions can be implemented. Depending on the processing power of the component chosen to implement the IDD 12, the filter function can range from a simple template-matching query filter to highly sophisticated, adaptive, cognitive, content analyzing, auto-classifier type capabilities. As a hardware system, the IDS 10 physically separates its host computer systems from an external system or network at the signal level. Thus, all viruses, worms, and other forms of hostile executable code contained in external signals or data sets are prevented from entering the host system, because all external signals are confined to the IDD 12. The IDS receives data, some of which might possibly be contaminated from external domains, extracts the "information" contained in this data, and safely transmits such "information" to the protected host 15.

Basic versions of the IDS implement a video-transformation modified-read process. This is a signal level (information preserving) data transformation. No outbound data or signal path from the host system exists. Thus unauthorized clandestine or inadvertent transmission of host data, is prevented. In the programmable IDS versions where signals are transmitted from the host, a comprehensive generic processor-based intermediate domain is provided which can be used with smart adaptive InfoSec agent programs capable of hostile-penetration countermeasure type functions. These functions include adaptive classifiers, session encryptors, and e-mail (payload) encryption functions, for safe transit of outgoing IDS data.

All IDS versions can also reside remotely from their host system. Such versions can be configured to protect several host systems simultaneously. The IDS architecture easily accommodates IDS to host encryption (i.e. end-to-end encryption) to protect data in transit through public networks linking the host and the IDS. Hybrid versions of the IDS which implement a modified-read (M-R) function to remove hostile data from incoming data streams, simultaneously implement a filter function, to prevent unauthorized data exfiltration from the host. The hybrid version combines any set of IDS versions to screen incoming traffic and outgoing traffic. It thus allows the host safe and simultaneous connectivity to domains of different security levels. In addition, the IDD, intermediate domain device can be set to control the host systems. In this mode of operation, the IDD becomes an administrative control device to selectively restrict host system access to the external domains (e.g. the Internet) and/or to confine signals incoming from external domains.

Figure 3:
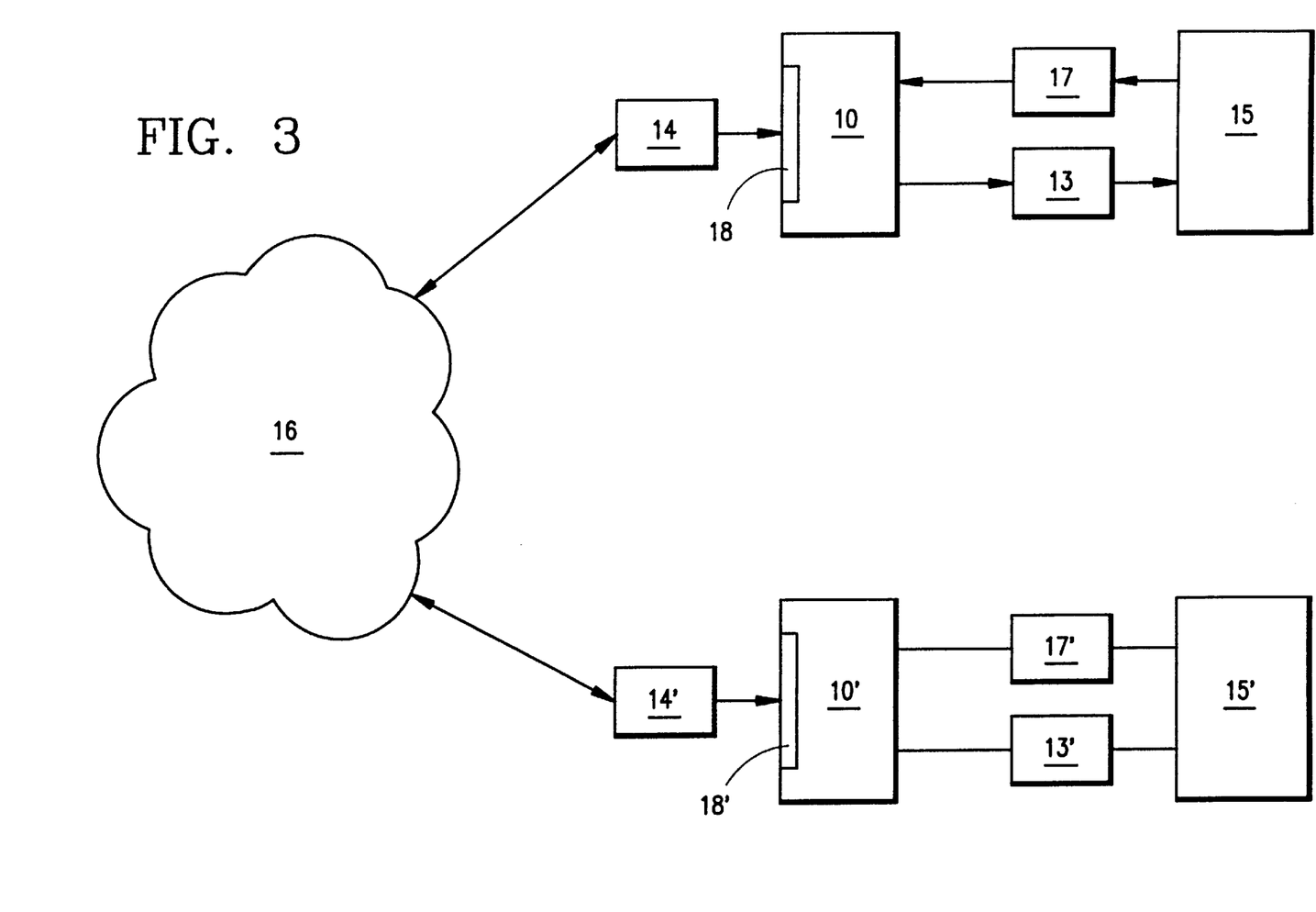
FIG. 3 illustrates an arrangement of several IDS devices in accordance with the invention, each of which use an authentication process for mutual identification, thus forming a secure network overlaying an intervening public or unprotected network.

Referencing FIG. 3, a network IDS 10, as defined in FIG. 2, is shown protecting a set of internal domains 15, 15', etc. The IDS 10 device includes programmable systems and includes an authentication processor 18 to implement a device-identification-number (DIN) authentication process to verify the identity and authorized presence of another IDS 10', or other device such as hosts 15, 15' in the network. The IDS 10' device includes an authentication process 18'. The communications subsystem of an IDS can use a DIN in the same manner that people use a PIN (personal identification number), with a bank card. DIN equipped IDS devices can operate a hardware-level inter-device authentication process. This DIN authentication process is operated during the initial handshake and randomly during a communications session, between IDS devices and/or other DIN equipped devices. A DIN can be variable, for added rigor. This process permits authorized network nodes/stations to identify any unauthorized and/or possibly malfunctioning nodes in a network. The IDS uniquely implements this process at the signal level of a network. Further, the DIN is encyphered by its IDS, for secure transit to other IDS devices. Thus, the process is invisible to hackers and other disruptors who operate at the software levels of a network. In the network shown, host 15 is connected to IDS 10 through outgoing socket 17 and incoming socket 13 while IDS 10 is connected to the external domain 16 through socket 14 and to networked IDS 10'. IDS 10' is connected to the external domain, or another external domain, through socket 14' and through host input socket 13' to host 15' and socket 17' from host 15'.

Figure 4:
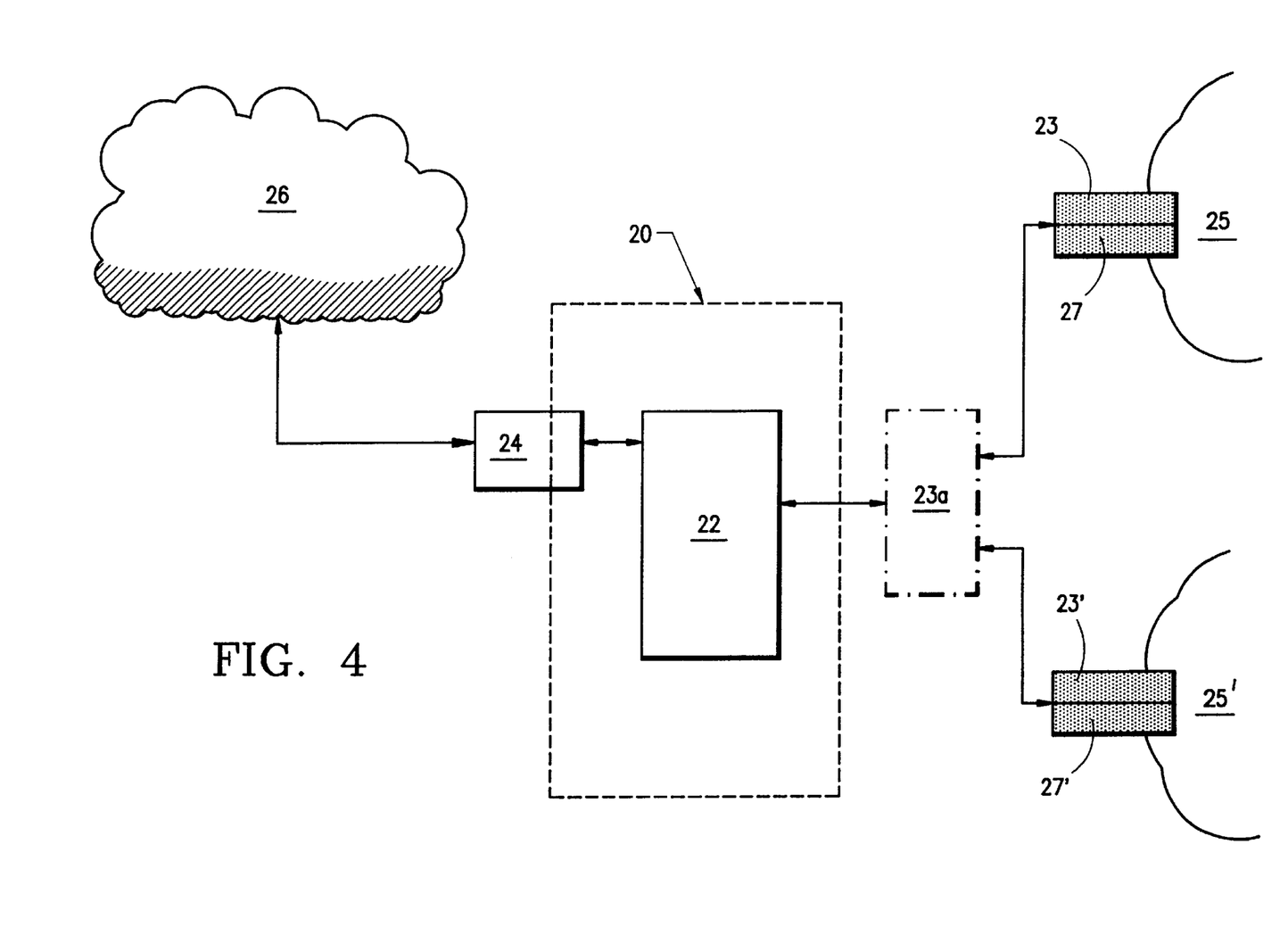
FIG. 4 illustrates another embodiment of the invention, wherein an IDS is condfigured to protect several internal domains from corruption or compromise by an external domain.

Referring to FIG. 4, the IDS architecture can utilize video teleconferencing technology. In this embodiment, an IDS 20 is defined, utilizing desktop video conference (DVC) technology. As a brief background, operational interface standards for DVC are evolving. Generally the standard designations are as follows:

H. 320→DVC over the ISDN/POTS telephone environment

H. 323→DVC over LAN environment

T. 120→Collaborative Computing (e.g. Whiteboarding)

The majority of present DVC capabilities address either H.320 (telephone domain) or H.323 (LAN domain) either (or both) of which is the external domain 26 from which signals are received by an IDS 20. We now consider a DVC capability which addresses both the LAN and the telephone domains. Such a capability will permit simultaneous LAN and telephone domain connection. Conceivably, a user could connect to a classified LAN, and the Internet, simultaneously. Most InfoSec policies would forbid such simultaneous connectivity. In FIG. 4, a LAN/phone capable DVC device such as a PictureTel 550 is used in an IDS 20. The IDD 22 of the invention contains a LAN/phone DVC card. Generally, the bVC card is a peripheral-device to the system containing it. The DVC card also is obviously an external (interface) socket 24 for the IDS. A video-switch 23a is used to pass information to internal (protected) domains 25 and 25'. This switch is thus a socket to the internal domains. Each internal domain communicates with the IDS 20, in a remote-control DVC mode through receiver sockets 23 and 23'. This can be achieved by a simple "whiteboarding function" which is a standard feature, that can permit one computer system to control another. Specifics would be driven by the T.120 standard and the particular devices used for implementation. By the video teleconferencing process, the information or original data set carried by signals from the external domain is processed through the IDD DVC card 24 so that the original data set is, at the output, a second data set from which information is extracted and is sent to the host domain in a video format. This conforms to the modified-read requirements for IDS operation. For applications where the unauthorized leakage/exfiltration of internal data, is of major concern, it should be remembered that the IDS 20 architecture via socket 27 forces all outbound signals from internal domains into the IDD 22. Signals in the IDD can be reviewed, manually and/or automatically for authorization, prior to interaction with external signals. This is a form of insider control. The IDS permits components to be remotely located. Also, the IDS can be remotely connected to its host system, with no reduction in the IDS ability to protect the host system. The IDS architecture is modular and thus permits modular maintenance and modular upgrade without adverse impact on the protection capability. As an example, for IDS applications using video signals, an advanced tv-card/video-signal-receiver can detect and filter unauthorized and/or undesired data signals imbedded in a video, e.g. tv signal transmissions. Such video receivers will, in their IDS function, isolate all incoming transmissions from program execution domains of the protected host system.

Figure 5:
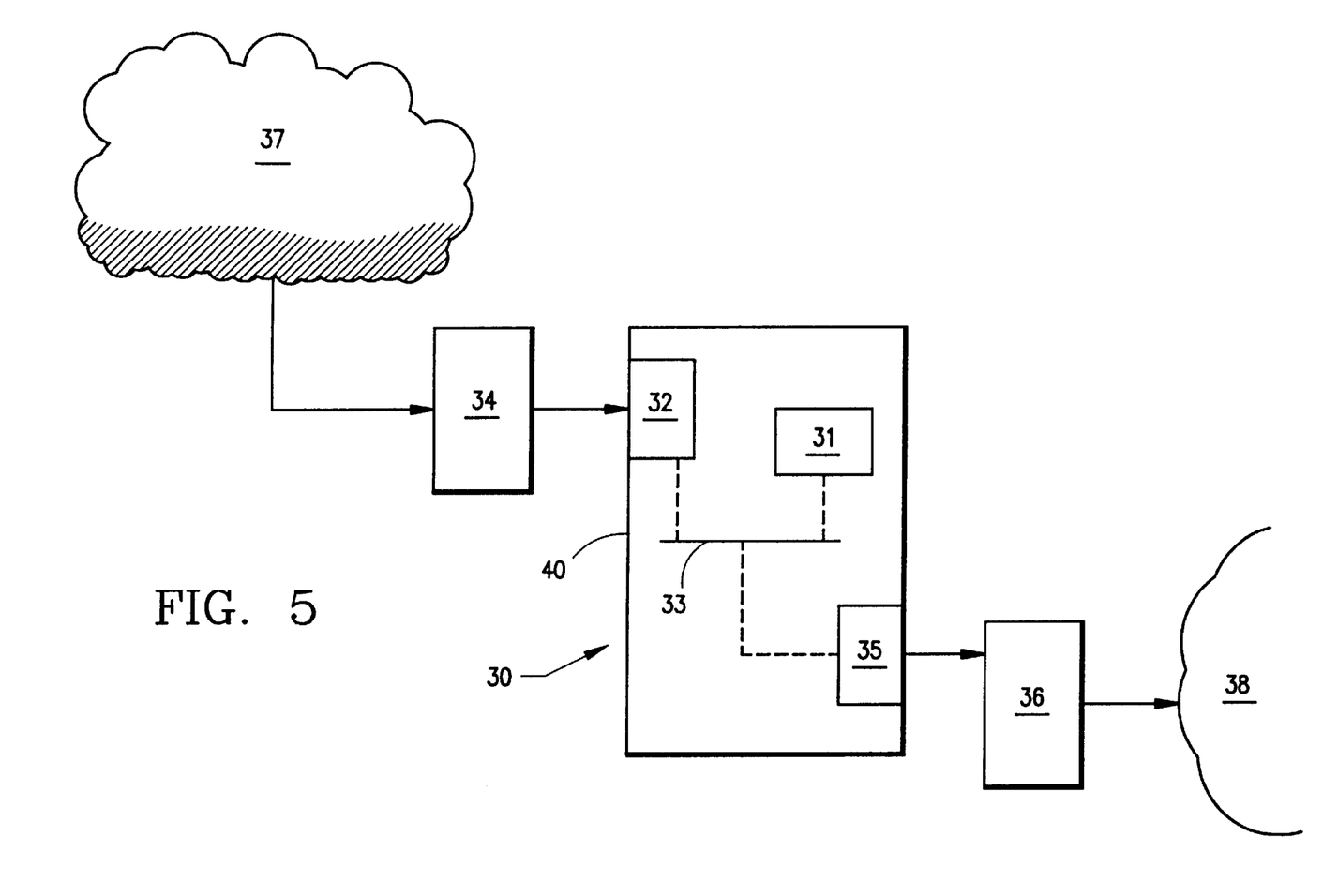
FIG. 5 diagrams the modified-read process executed by the invention of FIG. 2.

Referencing FIG. 5, a fundamental modified-read (M-R) process is illustrated. The modified-read operation deals with information transfer. Possibly contaminated signals and the data they carry are received from an external domain 37 via the extended interface socket 34 of an IDS 30. In this example, the transfer is between a control module 31 and an external-interface-module (EIM) 32 of the IDS 30 which is, for example, a single board computer (SBC), embedded microprocessor (EMB) or embedded micro-controller (EMC) personal computer. The bus control signals from the EIM are restricted so that an EIM cannot, relative to the main IDS bus 33, become bus master and thus initiate data transfer. This is accomplished by disabling (e.g. grounding) the appropriate main IDS bus/(IDD internal communications segment) control signals from the EIM's internal interface.

The modified-read operation functions as follows:

IDS Control Module (CM) 31 scans the external request buffer of EIM 32 and checks request pending flag (note: EIM main memory contents must remain in the EIM, to confine possible contamination). If a request is pending, set read flag in the execution buffer file (EBF) 35. EIM 32 continually scans for read flag in EBF 35.

If read flag is set, the modified-read process is initiated to process the incoming signal from the external domain such as by a facsimile process, a conversion to video format process, or a printed format process.

When the modified-read sequence is complete, EBF 35 ready flag is set and the control module 31 transfers EBF 35 to main memory, for processing.

The above sequence defines the information transfer within a modified-read operation. The actual external data, which may be contaminated, never leaves the EIM 32. Information in the EBF 35 is transferred through socket 36 to the protected domain 38.

From the command of the control module, the EIM 32 will transfer its main memory contents to the probe memory (or holding area) in the CM 31. Subsequent steps are as follows:

Probe functions of the CM 31 builds an execution buffer file (EBF) 35. This is a coded representation of relevant (to the IDS function) contents of the EIM's main memory. This EBF 35 is what is actually transferred from the EIM 32 into the control module 31 of the IDS, for insertion into the IDD-to-internal domain socket 36. This process acts as an electronic air-gap, blocking the transfer of possibly contaminated data.

The IDD 40 via the CM 31 acts on the EBF 35. The EBF format and contents are unknown to external domains 37, and inaccessible from these domains.

The EBF is transferred to the protected domain 38 via socket 36.

The CM 31 returns status, response to requests, flush commands, etc. to the EIM. Actual CM 31 responses are obviously application specific.

The EBF, constructed by the EIM probe function, must conform to a proper set of EBF patterns/sequences authorized and recognized by the CM.

Contaminated external data never leaves the EIM 32. This condition is enforced by allowing no raw external data to leave the EIM, in-bound to a protected system 38.

A prime modified-read (M-R) objective is to prevent inadvertent or externally controlled execution of hostile code. Secondary objectives include forcing internal user deliberate interaction for execution of received external executable code. The following guidelines should be used for M-R implementation:

Incoming binary (including executable) data strings must:

a) be modified to an alternate binary (non-executable) format;

b) be treated as non-executable data (e.g. text data) by the receiving system; and c) be transformed, preserving information, but alternating data strings.

Incoming data stream (binary) must not re-appear in the system (without direct user action).

Transformation properties (at receivers) must:

a) be known to external data transmitter;

b) not have an inverse derivable by transmitter (thus eliminating cryptography); and c) map data stream into machine usable format.

By way of Example:

Take binary data stream; $10001110100101000011110101111=(d_b)$

Transformation $T_{i|i \in N+}$

Then:

for example; ... $f_i(0)$, $f_i(1)$ ... $=T_i(d_b)$ $T_i(d_b)$; $T_i \; T_i^{-1} \neq I$ no inverse exists (where I is an identity transformation)

$T_i(d_b) \neq (d_b)$ no unity, (for all i)

$T_i(d_b)$ is processable only in non-executable domains of the receiving system.

By way of example, the modified real process may include the use of a facsimile machine to receive the incoming signal which may contain hostile data. The signal from the external domain is converted to print data which is a non-executable format at the receiving domain. The facsimile signals are scanned in, including by software, and forced into non-executable format for receiving domain processing.

The two primary InfoSec issues are first that possibly contaminated raw data does not enter the protected domain. Second, the incoming bit stream, the data virtual carrier, is not reproduced inside the protected domain. This second requirement is addressed by not using a direct inverse of the sending facsimile transformation. The information extraction transformation must not be an inverse of this original facsimile transformation. For some applications, an additional but not necessary safeguard would be restricting external knowledge of the actual recovery transformation used for the protected domain. If we view the original facsimile transformation as the transport transformation, and the scanning or print formation function as the recovery transformation, the general examples following could serve as transport/recovery transformation pairs:

EBCIDIC/ASCII $Font_i/font_j$ $Fax_i/Fax_j$ (where $Fax_j \neq Fax_i$)

text format/video format text format/printer format digital/analog digital format$_i$/ digital format$_j$ (where digital$_i \neq$digital$_j$)

signal format$_i$/ signal format$_j$ (where signal format$_i \neq$signal format$_j$)

The "Hamming Distance" between the bit representation of one character, in the transport transformation, to its equivalent representation in the recovery transformation could, in some instance, serve as a measure of appropriateness for transformation pairs. Obviously, other transformation pairs and acceptability metrics could be derived.

The IDS process permits necessary information exchange between host computer systems and an external network without intrusion of (possibly corrupted) external data signals into the host. The modified-read process is a universal virus, worm, hostile executable code eliminator. This signal level, modified-read process operates below the software layer of a system. Thus, the process is not dependant on prior knowledge of hostile data structures (unlike conventional software-based anti-virus type packages) to neutralize such hostile data. This neutralization function is a primary host protection mechanism used by the IDS.

Figure 6:
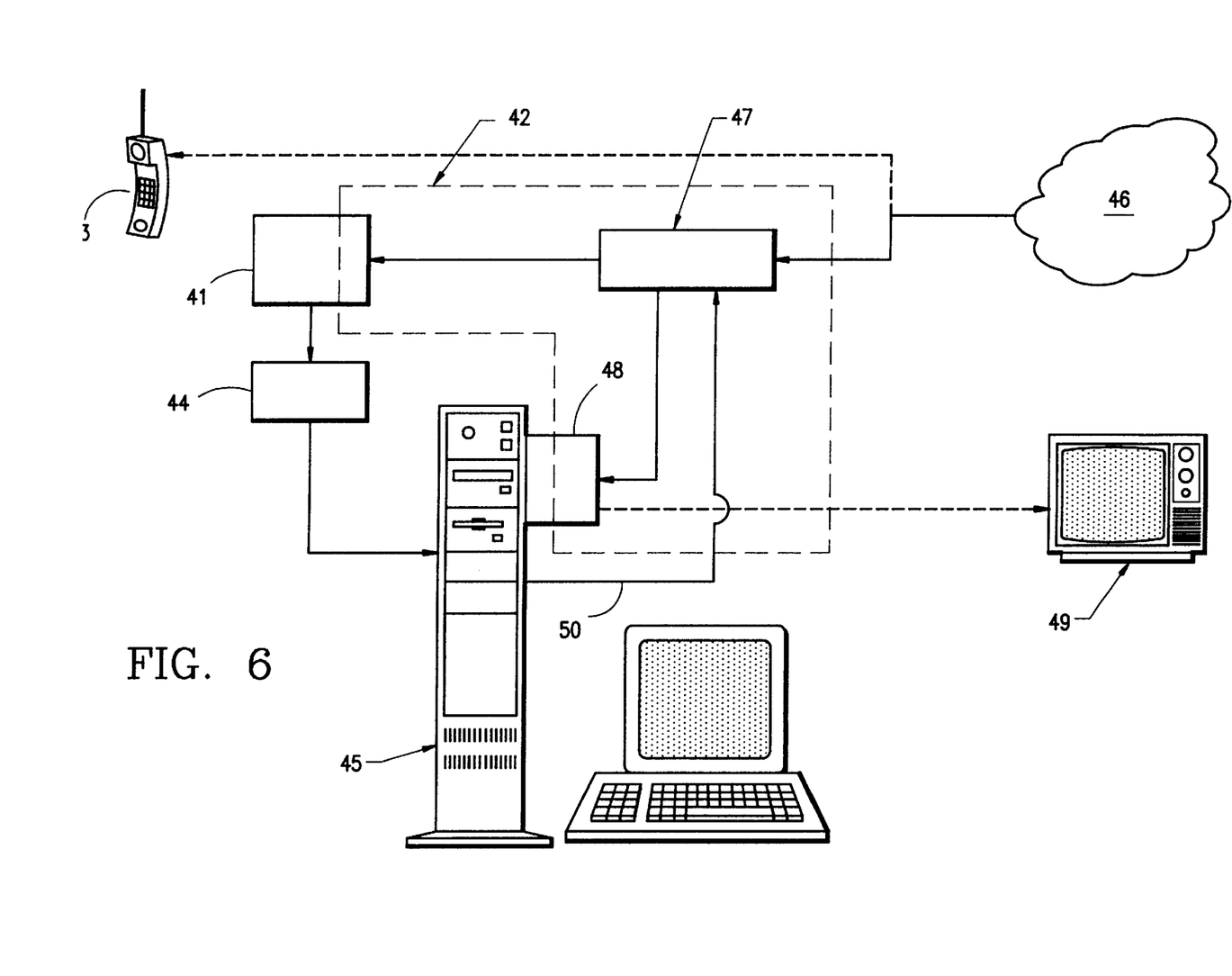
FIG. 6 illustrates a basic or elementary version of IDS of the invention.

Referring to FIG. 6, a television signal based version IDS 42 is disclosed. The host-system 45 is a Packard Bell PLT 2240 personal computer system. The external-domain 46 is the Internet/world-wide-web. Any PC or network of PC's can be protected in this manner. The intermediate domain device (IDD) 47 is a webtv system, for example Phillips/Magnavox MAT960A1 Internet Unit. The IDS 42 permits commercial off the shelf components to be used in their normal expected usage scenarios, without modification of any kind. As further illustration of this point, a television (PCI bus) card 48 (for example a Hauppauge 401 card) of the host system is connected to the webtv system unit. These are signal transformation processes that are implemented for the required modified-read process of the IDS. Such processes isolate all incoming signals from program execution domains of the host system, while making the "information content" of the incoming signals available to the host system 45. InfoSec integrity of the host is thus maintained.

As shown in FIG. 6, the tv card 48 transforms the output of the IDD 47 to a format different from that of the external domain 46 and which is processable by the host 45. Also shown in the drawing figure is an actual television 49 which is connected to an input of the television card 48 and which is utilized to verify that a true television signal is being received at the card thus insuring the correct operation of the tv card. As opposed to sending a signal from the webtv 47 to the television card 48, other signal transformations are possible, for example the signal can be outputted to a facsimile machine or printer 41 from the webtv IDD 47. The printer constitutes a signal transformation processor which preserves the information in a printed format as received from the webtv IDD 47. The preserved transformed signals of the print copy from the printer 41 can be scanned by a scanner 44 to create a transformed signal which can be provided to the host system 45. A standard telephone 43 is also shown in the drawing figures and is utilized to check operation of the communications link between the IDS 42 (including the webtv system 47) and the external domain 46.

With continued reference to FIG. 6, the invention may also be used to protect the host during the updating of host system files. As shown, the host 45 may be connected at socket 50 such that files from the host can be downloaded to the IDD 47 of the IDS 42. In this embodiment, (which excludes use of a webtv type IDD) the file information is retained in a file buffer in the IDD. The IDD receives signals from the external domain and processes the signals as described in FIG. 5 with respect to IDD 40 to thereby preform the modified-read process and obtain signals having a different data set. Information is extracted from the initial data set in such a manner as to derive a second data set which is then sent to the file buffer to update the file information downloaded from the host 45 and the updated file is thereafter forwarded as a tv signal to the socket or tv card 48 of the host. Thus, the file of the host is updated without any undesirable data being transmitted to the host system. In some embodiments no host to IDD socket exists. Thus, no signal path for exfiltration of the domain signals is available. With the protected system thus isolated from cyberspace and/or other hostile domains, it can be safely connected to a classified domain/network without danger of compromise to that classified domain.

The intermediate domain system of the present invention is a system within a system type architecture wherein such systems and subsystems may be activated and deactivated to achieve maximum IDS functional flexibility. As an example, if the IDS is implemented to reside internal to his host, the host interface module is activated. If the IDS is implemented to reside external to the host, a communication subsystem linked to the host/internal domain is used to embody an outgoing socket between the protected host and the IDS similar to socket 17 of FIG. 2. In either case, the modified-read subsystem includes the incoming socket from the external domain.

Figure 7:
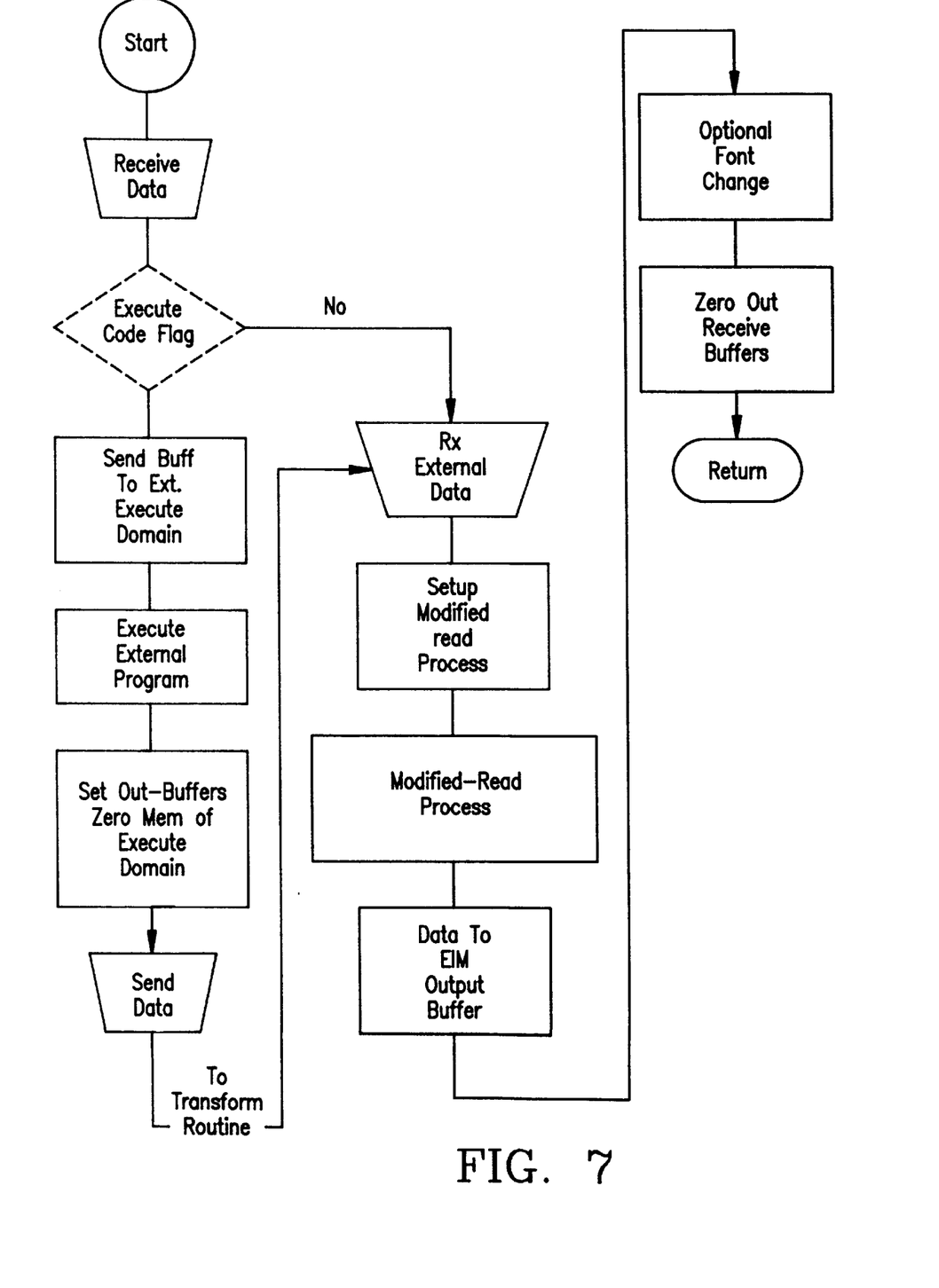
FIG. 7 illustrates the generic logic structure of the invention.

With reference to FIG. 7, the IDS operation will be described in detail. A data set, possibly contaminated, is received by the communication subsystem where it is important to note that the data set is carried in a signal format as previously discussed and the signal format may also be corrupted. The processing data flow controller subsystem accesses the received data set and determines if it is program and/or control data that must be executed. If program execution is required, the data set is transferred to the external processing domain (of the IDD) for execution and the results of the execution are returned to the processing data flow controller subsystem for transfer to the modified-read subsystem. If no program execution is required, the processing data flow controller subsystem transfers the data set to the modified-read subsystem directly. The modified-read subsystem operates as described with respect to the embodiment of FIG. 5 discussed above afterwhich the IDS is zeroed out to delete the processed data set to enable processing of a subsequent data set after the information has been extracted for passage to the protected system.

Figure 8:
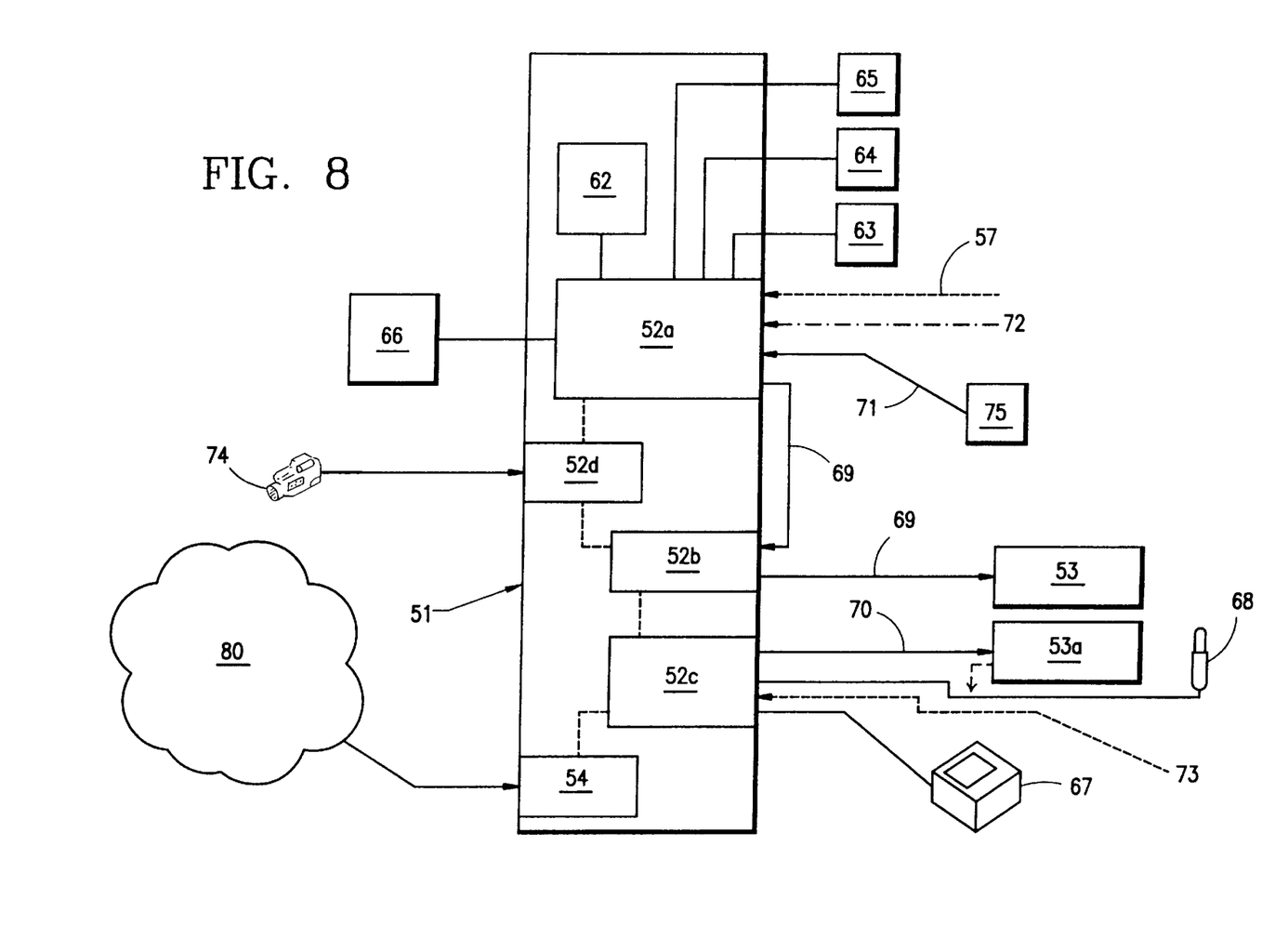
FIG. 8 illustrates a multi-function embodiment of the invention.

FIG. 8 illustrates a multifunction IDS configured for video teleconferencing. The IDS chassis 51 is that of its host such as 45 of FIG. 6, if the IDS is implemented to reside internal to its host. In this case, all add-in cards of FIG. 8 (i.e. cards 52a, 52d 52b, 52c, and 54; whereby card 52a is a modified single board computer (SBC) and card 52d is a video capture card, card 52b is a graphics accelerator, 52c is a sound card, card 54 is a modem type embodying an external domain interface socket. The socket may be in the form of a modem board or a network or cable interface type card. The cards 52a, 52b, and 52c comprise the intermediate-domain-device (IDD) of the IDS. As shown, an IDS can reside internal to its host, if its SBC's interface to the host's expansion bus is configured as an add-in card. The SBC 52a thus uses only devices directly connected to it, and not those devices connected to the host's expansion bus. For the case of an IDS implemented to reside external to its host, the add-in cards reside on the passive backplane of the IDS chassis 51. The SBC 52a implementing the control module of the IDD, controls the IDS from its slot on the IDS device's passive backplane. Cards 53 and 53a form a socket, and are a tv card 53 and a sound card 53a both residing in the host system's expansion bus. Socket 57 is a one way direct cable connect (DCC) link from the host system to the SBC and is used for direct data transfers to the IDD. Modules 31, 32, 33 and 35 (from FIG. 5) reside in the SBC 52a. The internal hard drive 62 is connected to the IDD's SBC 52a and resides in a bay in the chassis 51 of the IDS or, the chassis of the host, if the IDS resides internal to the host. A compact-disk (CD) drive 63, backup tape drive 64, floppy disk drive 65, and the smart-card reader 66 can each reside internal to or external to the chassis 51, where each device is connected to the IDD's SBC 52a, permitting the IDS to operate as an independent system whether residing internal to or external to its host. A joystick 67 as well as a microphone 68 are connected to the IDD sound card 52c, to support telephony, video telephony, network gaming, and video conferencing type functions. In addition to its InfoSec functions (and those just mentioned), the IDS is ideal as a special function platform, which frees the host for simultaneous execution of other tasks. Video monitor (VGA) signals 69, move from 52a to 52b to socket 53. Audio signals 70 move from 52c to socket 53a. This video and audio information transfer is a "video based" modified-read process. Signals 72 and 73 are video and audio output from the host domain. Signals 71 from a keyboard or mouse 75 are applied to the IDD's SBC 52a. Finally, a video camera 74 necessary for video conferencing and video telephony operations is connected to the card 52d of the IDS. Using the teachings of the invention, all incoming signals from all input sources such as to the modem 54 which receives signals from the external domain 80, the camera 74, disk drive 63, tape drive 64, floppy disk drive 65, smart card reader 66, joy stick 67 and microphone 68, are processed through the cards 52a, 52b, 52c, 52d acting as the IDD and are transformed so that the host/protected domain remains safe and isolated from the external signal source, which may be contaminated. If a desktop-video-conferencing (DVC) type card is used for an input socket 54, instead of a standard modem, microphone and video camera inputs could go directly to the DVC card. A V.90 standard (or better) compatible modem is recommended for older telephone system type video-phone usage. Other, high bandwidth, high performance modems and other communication type devices such as network interface cards, cable system interface devices may be used to embody socket 54. All external signals, contaminated or not, are confined within the IDD.

Figure 9:
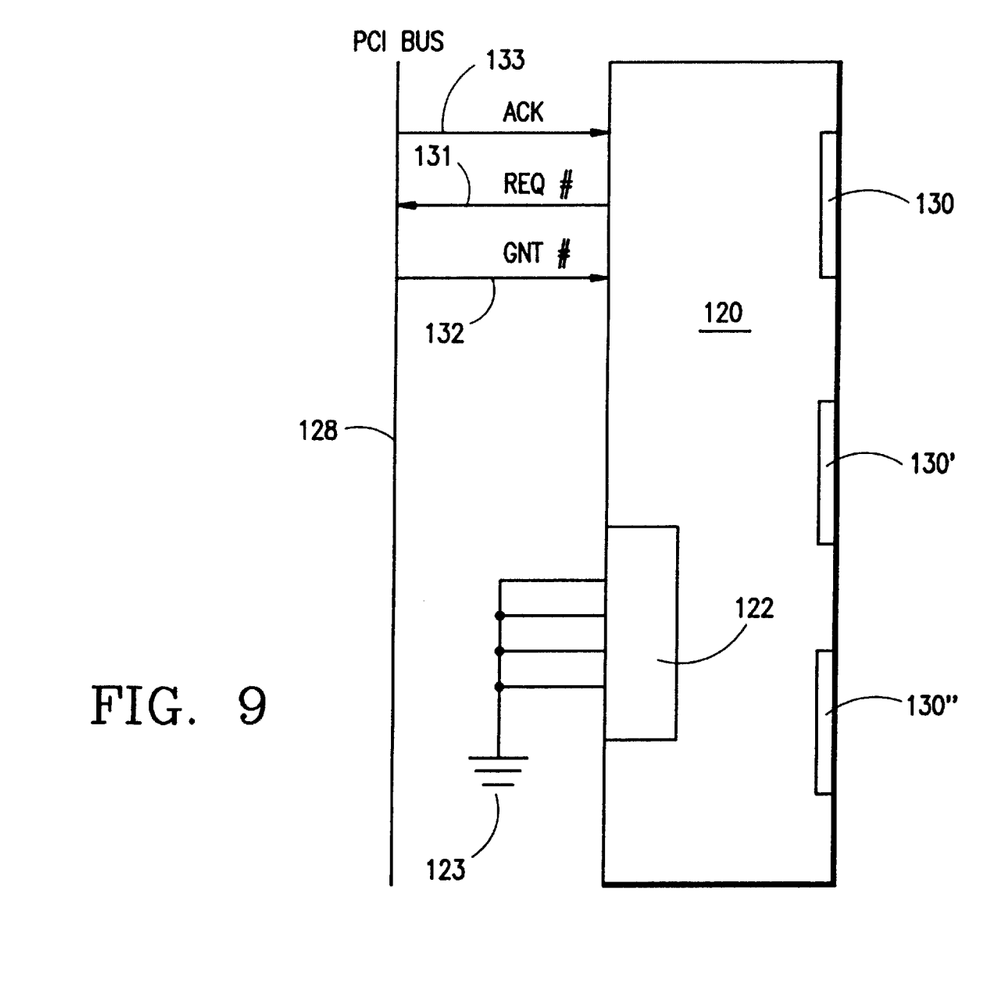
FIG. 9 illustrates a modification to a single board computer functioning as an intermediate domain device internal to its' host.

Referencing FIG. 9, an. SBC 120 to be used is an IDD residing internal to its' host, such as the computer 45 of FIG. 6, must be modified in the manner of FIG. 9 wherein the bus control and arbitration signals 122 are deactivated such as by grounding at 123 and the bus master/slave signals 131, 132 and 133 are enabled such that the modified SBC 120 interfaces to the host peripheral bus 128 as a standard add-in card. The PCI bus specification is used in FIG. 9 to illustrate this generic modification procedure. The modified SBC retains its' internal/on-board connections 130, 130' and 130" to which SBC dependent peripheral devices may be connected thus forming a "system within a system" capability for the host.

When modifying the SBC for use in a "system within a system" environment, the following procedures must be followed:

a) the SBC arbitration-control signals must be disabled to prevent control arbitration of the protected systems expansion-bus by the SBC;

b) enabling only the bus-master and bus target capability of the modified SBC which respectively permits initiating and reception of expansion-bus data set transfers; and c) ensuring that the interface to the protected system's expansion bus can not act as a bridge module between the protected system's expansion bus and the IDD device's on-board local bus, thus isolating on-board bus connected devices from the protected system's expansion-bus connected devices and enabling a secure "system within system" architecture.

The three generic modifications discussed above are achieved for example when the protected systems expansion bus conforms to the peripheral component interconnect (PCI) bus 128 by allowing the modified SBC add-in card 120 functioning as the IDD to assert an REQ# (a bus request) at 131 and to only receive GNT# (bus grant) control signals 132, and ACK# (acknowledge) type signals 133 in a PCI configuration, thus ensuring the IDD peripheral devices are not directly accessible from the protected system's expansion bus. A multiplicity of such modified SBC systems can be used in a single IDD, to render that IDD extremely fault-tolerant, and dynamically flexible.

It is expected that the present invention (the IDS) and many of its attendant advantages will be understood from the forgoing description and it will be apparent that various changes may be made in form, implementation, and arrangement of the components, systems, and subsystems thereof without departing from the spirit and scope of the invention or sacrificing all of its material advantages, the forms hereinbefore described being merely preferred or exemplary embodiments thereof.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A method of enabling information exchange between a protected system and an external information source wherein the information is contained in an initial data set carried by a signal while preventing any hostile data carried by the signal and which is executable in a first format of the signal from reaching the protected system in an executable format, including the steps of:

a. using an intermediate domain computer hardware device to receive the signal containing the initial data set transmitted from the external information source;

b. processing, within the intermediate domain computer hardware device, the signal by containing the initial data set within the intermediate domain computer hardware device and transforming the first format of the signal into a different second format to thereby form a second data set containing the information and such that the hostile data is not executable in the second format; and c. thereafter passing the second data set to the protected system whereby any hostile data included in the signal is transformed from an executable state to a non-executable state in the second format.

2. The method of claim 1 wherein the processing step includes selecting an internal data set from the protected system that is to be updated by the information in the initial data set, transferring the internal data set to the intermediate domain computer hardware device from the protected system and thereafter processing the internal data set within the intermediate domain computer hardware device with the information in the second data set, and thereafter passing the processed internal data to the protected system to create processed internal data.

3. The method of claim 2 including the additional step of filtering the selected internal data set for authorized transfer to the intermediate domain computer hardware device.

4. The method of claim 1 wherein the processing step includes buffering the signal containing the initial data set and any hostile executable data in the intermediate domain computer hardware device.

5. The method of claim 1 in which the first and second formats are selected from a group of formats consisting of analogue, digital including wherein $digital_1 \neq digital_2$, printer, telephone, video, optical, facsimile, text, font, EBCIBIC and ASCII and electro-magnetic and electro-optic signals.

6. The method of claim 5 including the additional step of screening internal data sets being transmitted from the protected system to an external system through the intermediate domain computer hardware device such that only authorized data sets enter the intermediate domain computer hardware device from the protected system.

7. The method of claim 1 including connecting the intermediate domain computer hardware device to an internal bus of a computer system operating as the protected system.

8. A system for enabling information exchange between a protected system and an external information source wherein the information is contained in an initial data set carried by a signal while preventing any hostile data carried by the signal and which is executable in a first format of the signal from reaching the protected system in an executable format, the system including:

a) means for connecting an intermediate domain computer hardware device between the external information source and the protected system to receive the signal containing the initial data set from the external source;

b) signal processing means within the intermediate domain computer hardware device, for processing the signal containing the initial data set by confining the initial data set within the intermediate domain computer hardware device and to transform the first format of the signal into a different second format by forming a second data set containing the information and such that any hostile data is not executable in the second format; and c) means for passing the second data set to the protected system whereby any hostile data included in the signal is transformed from an executable state to a non-executable state in the second format.

9. The system of claim 8 in which said means for passing includes a first socket element for receiving the second data set and for conveying the second data set to the protected system.

10. The system of claim 9 including a second socket element for connecting the protected system to the signal processing means whereby information from the protected system may be selectively transferred to the signal processing means.

11. The system of claim 10 including means for filtering information to be transmitted through said second socket element to thereby prevent unauthorized release of information from the protected system.

12. The system of claim 8 wherein said intermediate domain computer hardware device is selected from a group of computer hardware devices consisting of single board computers, modified single board computers, embedded microprocessors, embedded microcontrollers, personal computers, webtv units, portable/laptop computer systems, mainframe computers and network computer systems.

13. The system of claim 8 including authorization screening means for identifying the protected system for authorized access to the intermediate domain computer hardware device.

14. The system of claim 8 including verifying means connected to said intermediate domain computer hardware device for verifying the transformation of the signal in the first format to the second format.

15. The system of claim 8 in which said signal processing means includes means for converting a telephone signal format to a video signal format.

16. The system of claim 8 in which said signal processing means includes means for converting a telephone signal format to a printed format.

17. The system of claim 16 including means for converting the printed format to an analog or digital signal to be passed to the protected system.

18. The system of claim 8 in which said means for connecting, said signal processing means and means for passing are mounted to a bus of the protected system.

19. The system of claim 18 including a plurality of intermediate domain computer hardware devices.

20. The system of claim 8 including a plurality of intermediate domain computer hardware devices, and means for identifying authorized intermediate domain computer hardware devices in a network of such devices.

21. The system of claim 20 wherein the means for identifying includes a DIN authentication capability.

22. A method of enabling secure information exchange between a protected system and an external information source on the internet wherein the information is contained in an initial data set carried by a signal while preventing any hostile data carried by the signal and which is executable in a first format of the signal from reaching the protected system in an executable format, including the steps of;

a. using an intermediate domain computer hardware device between the external information source on the internet and the protected system to receive the signal containing the initial data set transmitted from the external information source;

b. processing, within the intermediate domain computer hardware device, the signal containing the initial data set by containing the initial data set within the intermediate domain computer hardware device and transforming the first format of the signal into a different second format to thereby form a second data set containing the information and such that any hostile data which is executable within the initial data set is not executable in the second format;

c. thereafter, passing the second data set to the protected system whereby any hostile data included in the signal is transformed from an executable state to a non-executable state in the second format.

23. The method of claim 22 including selecting the intermediate domain computer hardware device from a group of computer hardware devices consisting of single board computers, modified single board computers, embedded microprocessors, embedded microcontrollers, personal computers, webtv units, portable/laptop computer systems, mainframe computers and network computer systems.

24. The method of claim 22 in which the first and second formats are selected from a group of formats consisting of analogue, digital including wherein $digital_1 \neq digital_2$; printed, telephone, video, optical, facsimile, text, font, EBCIBIC and ASCII and electromagnetic and electro-optic signals.

* * * * *